(12) United States Patent
Keskes et al.

(10) Patent No.: US 7,796,469 B2
(45) Date of Patent: Sep. 14, 2010

(54) METHOD AND PROGRAM FOR FRACTURE PLANE RECONSTRUCTION

(75) Inventors: Naamen Keskes, Pau (FR); Marc Donias, Bordeaux (FR); Yannick Barthoumieu, Talence (FR); Sébastien Guillon, Pau (FR)

(73) Assignee: Total S.A. (FR)

( * ) Notice: Subject to any disclaimer, the term of this patent is extended or adjusted under 35 U.S.C. 154(b) by 0 days.

(21) Appl. No.: 12/477,296

(22) Filed: Jun. 3, 2009

(65) Prior Publication Data

US 2009/0238039 A1    Sep. 24, 2009

Related U.S. Application Data (63) Continuation of application No. 11/256,999, filed on Oct. 25, 2005, now Pat. No. 7,596,056.

(30) Foreign Application Priority Data

Oct. 26, 2004    (EP) ................................. 04292530

(51) Int. Cl.
    *G01V 1/34* (2006.01)
(52) U.S. Cl. .......................................... 367/72; 367/73
(58) Field of Classification Search ................... 367/38, 367/72, 73
    See application file for complete search history.

(56) References Cited

U.S. PATENT DOCUMENTS

| | | | | |
|---|---|---|---|---|
| 4,633,448 A | * | 12/1986 | Koeijmans | 367/72 |
| 4,800,539 A | * | 1/1989 | Corn et al. | 367/72 |
| 4,984,220 A | * | 1/1991 | Bodine et al. | 367/68 |
| 5,056,066 A | * | 10/1991 | Howard | 367/72 |
| 5,153,858 A | * | 10/1992 | Hildebrand | 367/72 |
| 5,251,184 A | * | 10/1993 | Hildebrand et al. | 367/72 |
| 5,432,751 A | | 7/1995 | Hildebrand | |
| 5,537,320 A | * | 7/1996 | Simpson et al. | 702/14 |
| 5,570,106 A | | 10/1996 | Viswanathan | |
| 5,940,778 A | | 8/1999 | Marfurt et al. | |
| 6,014,343 A | | 1/2000 | Graf et al. | |
| 6,016,287 A | * | 1/2000 | Klebba et al. | 367/72 |
| 6,018,498 A | | 1/2000 | Neff et al. | |
| 6,055,482 A | * | 4/2000 | Sudhakar et al. | 702/16 |
| 6,131,071 A | * | 10/2000 | Partyka et al. | 702/16 |
| 6,138,076 A | * | 10/2000 | Graf et al. | 702/14 |
| 6,191,787 B1 | | 2/2001 | Lu et al. | |

(Continued)

FOREIGN PATENT DOCUMENTS

EP    1653411 B1    7/2008

OTHER PUBLICATIONS

European Search Report, Apr. 8, 2005.

(Continued)

*Primary Examiner*—Scott A Hughes
(74) *Attorney, Agent, or Firm*—Blank Rome LLP (57) ABSTRACT

The invention relates to a method for fracture plane reconstruction in a three-dimensional set (20) of values, comprising the steps of providing a computer with the three-dimensional set, display by the computer of a succession of plane sections (10) of the three-dimensional set, selection by the user of points of the fracture plane over some of these sections during their display; and reconstruction by the computer of the fracture plane from the selected points.

36 Claims, 7 Drawing Sheets

U.S. PATENT DOCUMENTS

| | | | |
|---|---|---|---|
| 6,266,618 B1 * | 7/2001 | Ye et al. ................ | 702/10 |
| 6,278,949 B1 * | 8/2001 | Alam ................ | 702/16 |
| 6,636,618 B1 * | 10/2003 | Keskes et al. ................ | 382/109 |
| 6,850,845 B2 * | 2/2005 | Stark ................ | 702/16 |
| 6,853,922 B2 * | 2/2005 | Stark ................ | 702/14 |
| 7,330,791 B2 | 2/2008 | Kim et al. | |
| 2003/0112704 A1 | 6/2003 | Goff et al. | |
| 2004/0193960 A1 * | 9/2004 | Vassilev ................ | 714/38 |
| 2006/0190214 A1 | 8/2006 | Keskes et al. | |
| 2007/0078604 A1 * | 4/2007 | Kim et al. ................ | 702/16 |

OTHER PUBLICATIONS

Chopra, et al. "3D Seismic Interpretation and Visualization." GeoHorizons, Feb. 96.

Peterson, M.P., "Active Legends for Interactive Cartographic Animation," International Journal of Geographical Information Science, London, GB, vol. 13, No. 4, Jun. 1999, pp. 375-383.

Peterson, M.P., "Spatial Visualization Through Cartographic Animation: Theory and Practice," GIS/LIS Proceedings American Soc. Photogrammetry & Remote Sensing Bethesda, MD, USA, Oct. 27, 1994, pp. 619-628.

Reinhardt, J. M. et al., "Cue-based Segmentation of 4D Cardiac Image Sequences," Computer Vision and Image Understanding Academic Press USA, vol. 77, No. 2, Feb. 2000, pp. 251-262.

SGI. "SGI and TotalFinaElf."

* cited by examiner

METHOD AND PROGRAM FOR FRACTURE PLANE RECONSTRUCTION

RELATED APPLICATIONS

This application is a continuation of U.S. patent application Ser. No. 11/256,999, filed on Oct. 25, 2005, which claims priority to European Patent No. EP042925305 filed Oct. 26, 2004.

This invention relates to the reconstruction of a fracture plane in a three-dimensional set of measurements, called three-dimensional block hereafter. It relates to the fields of geology, seismics, medical imaging or to any field using imaging techniques.

It is known, in particular in oil exploration, to determine the position of oil reservoirs from the interpretation of geophysical measurements carried out from the earth's surface or in boreholes. These measurements typically involve the transmission of a wave into the sub-soil and measurement of the various reflections of the wave on the sought geological structures—surfaces separating distinct materials, fractures etc.

In geophysics the tracking of a seismic marker on the images or seismic sections provided by processing seismic measurements obtained by seismic acquisition, is called "picking". A seismic marker is always situated on the boundary between two geological structures of different kinds or, in other words, between two facies.

Most often the markers line up on seismic horizons. Conventional methods consist of manually tracking the seismic horizons by picking the points which make up a given horizon, then joining them together. A few methods for automatic propagation have been proposed for the picking of seismic horizons; their objective is to allow, starting from one or more points representing the horizon, other similar seismic markers to be determined automatically.

A seismic marker can also indicate a fracture plane. However, only manual picking tools are currently available for the picking of fractures. These tools display a seismic section, at the user's request, and allow the user to click on markers of the fracture of the displayed section. On demand, the user can successively display the different sections one by one; on each of the sections the user can click on the markers of the fracture. This is static picking, independent on each of the displayed sections. Such a tool is for example provided by the company Schlumberger under the reference Charisma. It should be noted that a fault is a type of fracture which has a significant displacement, called net slip, between the two parts on either side of the fracture.

The manual picking of a fracture lacks efficiency in the situation where the data, namely the three-dimensional block, is of poor quality, i.e. it has a low signal to noise ratio. In fact, it is difficult to detect the points of a fracture on a given section when this section has a low signal to noise ratio. The selection of points of the fracture is, in this case, difficult for each of the sections, taken independently of one another. Another difficulty is the tracking of the fracture, during the display of different sections; the user can in particular confuse neighboring fractures. Moreover, points not belonging to the fracture can be selected, an error which risks multiplying the difficulties of reconstructing the surface of the fracture from the selected points in the different sections.

Consequently, the invention proposes a method for fracture plane reconstruction in a three-dimensional set of values, comprising the steps of:

providing a computer with the three-dimensional set;
displaying by the computer a succession of surfaces of the three-dimensional set, such as plane sections, combinations of planes or curved surfaces;
selecting by the user of points of the fracture plane over some of these surfaces during their display; and
reconstructing by the computer the fracture plane from the selected points.

It can be envisaged that the display step comprises the display of surfaces on the same scale. Furthermore, a step of provision of a trajectory by the user can be added and in this case, the display step comprises the display of surfaces orthogonally to the trajectory.

The method can also have one or more of the following characteristics or steps:

the displaying step comprises the display of the surfaces at a speed greater than 5 images per second, and preferably between 10 and 20 images per second;
a step wherein the user can choose the distance between two successive surfaces;
a step of storage of selections of points and a step of repetition of the display and selection steps during which the stored points are displayed;
a step of editing the selected points;
the steps of selecting the points and reconstructing the fracture are simultaneous;
a step of displaying the reconstructed fracture, for example by masking by a planigraphic plane of a part of the surface or by displacement of the planigraphic plane.

The invention also proposes a computer program recorded on a computer-readable medium, comprising a program code suitable for implementation of all the steps of this method on a computer. Finally, the invention proposes a system comprising a memory conjoining this program, a program processing logic unit and a display unit and an input/output unit allowing picking on the display unit.

Other characteristics and advantages of the invention will become apparent on reading the following detailed description of the embodiments of the invention, given by way of example only and with reference to the drawings which show.

The invention proposes a method for the reconstruction of a fracture plane. The method uses the display of successive surfaces to the user, allowing the user to pick during the display. This dynamic picking allows the user to better track the markers over successive surfaces.

The examples developed hereafter to illustrate the claims belong in general to the field of seismics. Similar examples can be taken from other technical fields.

Figure 1:
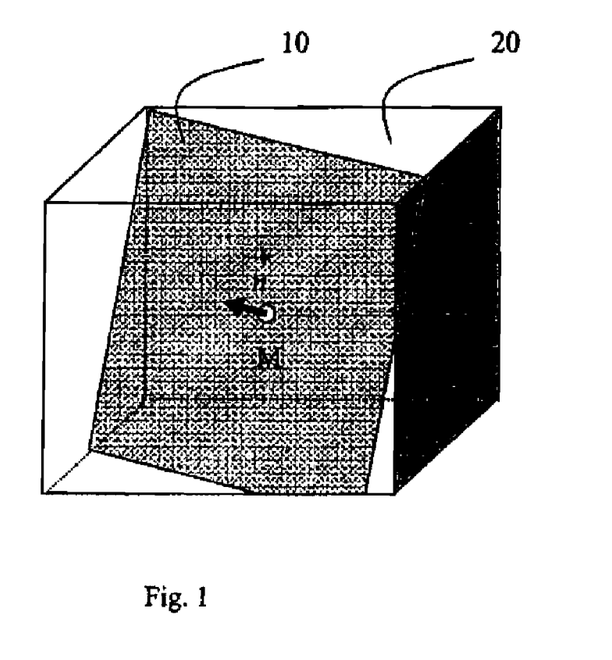
FIG. 1, a diagrammatic representation of a section of a three-dimensional block in a system of the prior art.

FIG. 1 represents a diagram of a three-dimensional block 20 and a section 10 cutting across the block. The three-dimensional block of data is constituted by a set of points recorded in a determined volume and allocated values obtained following transformations carried out on the measurements acquired in this volume of points.

The method firstly comprises providing the three-dimensional block 20 of data to the computer. It also comprises a step of displaying a succession of surfaces 10 of the three-dimensional block 20 of measurements by the computer. The successive surfaces are displayed for the attention of the user, without the user having himself to order the display of the following surface.

The surfaces 10 can correspond to defined shapes such as a plane section, a combination of planes, even a curved surface.

The plane sections 10 of examples of the figures correspond to plane cross sections or parts of plane cross sections of the three-dimensional block 20.

A combination of planes correspond to a set of planes connected by their edges, each plane forming a part of a cross section of the three-dimensional block. The combination can thus comprise a principal plane with at least one plane forming an edge with the principal plane. The principal plane can be perpendicular to the direction of progression, whilst the other plane or planes—numbering 2 or 4 for example—move away from or come towards the user.

A curved surface is a surface defined by its radius and its center of curvature forming a cross section or a part of a cross section of the three-dimensional block; more generally it can be a surface of revolution such as a paraboloid, a hyperboloid, an elliptic surface or even a skew surface. In the case of a surface of revolution, the axis of revolution advantageously corresponds to the direction of propagation.

The surfaces 10 thus contain points of the three-dimensional block 20 to which values are allocated.

The display step is carried out so that the selected surfaces 10 and their speed of display allows the user to track displacements of the points of the three-dimensional block 20 belonging to the limit of the fracture over successive surfaces 10.

A succession of surfaces 10 of the three-dimensional block 20 will be called a sequence in the rest of the description.

FIGS. 4 to 7 give an horizon example with a fracture and show successive plane sections displayed to the user. The example of FIGS. 4 to 7 is given with reference to surfaces which are plane sections.

Figure 4:
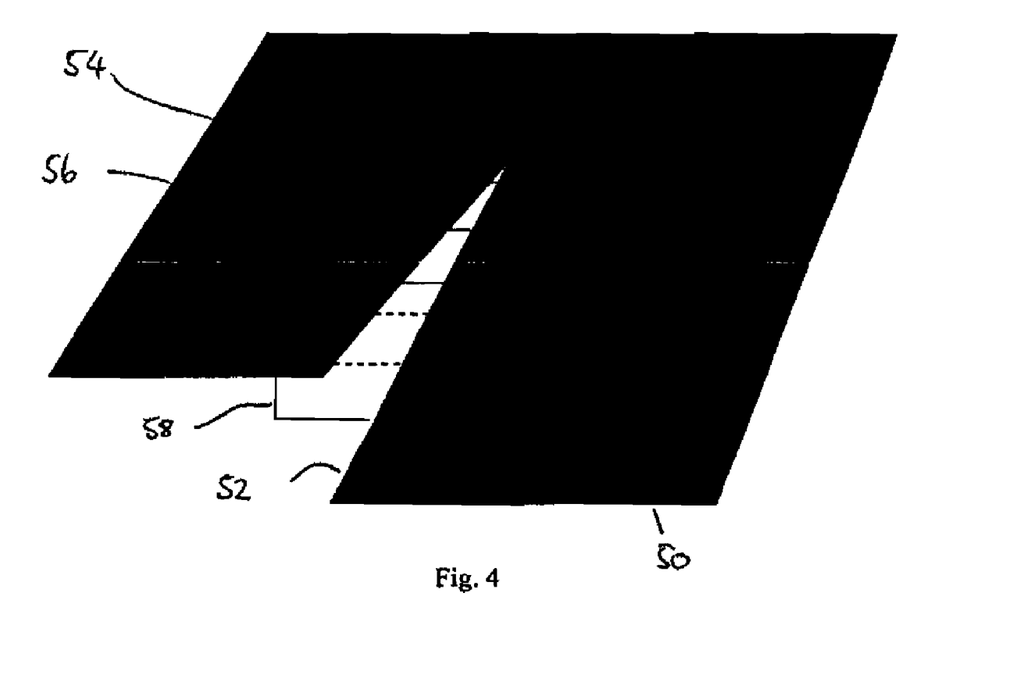
FIG. 4, a perspective view of an horizon showing a fracture, with a diagrammatic representation of the sections successively displayed to the user according to the invention.

FIG. 4 shows a perspective view of an horizon 50, which has a fracture 52; in addition FIG. 4 shows the different sections 54, 56 and 58 displayed successively to the user and represented in FIGS. 5 to 8. In the example of FIGS. 4 to 7, the sections are displayed to the user by moving backwards from the rear of FIG. 4 towards the front of FIG. 4. In the example, the trajectory is parallel to the right fault wall of FIG. 4—such that the right part of FIGS. 5 to 7 appears stationary to the user. Moreover, the trajectory is orthogonal to the view plane, as explained below.

Figure 5:
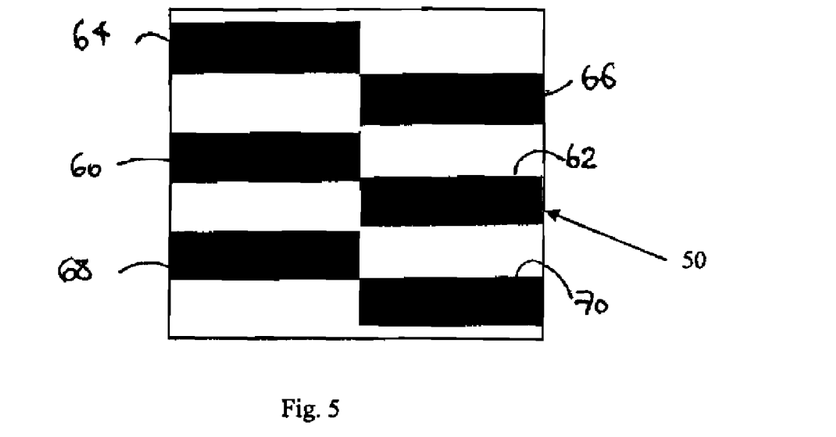
FIGS. 5 to 7, diagrammatic views of the sections of FIG. 4.

FIG. 5 shows a diagrammatic view of the first section 54 displayed to the user. This view is diagrammatic: on the one hand it only represents the markers in the vicinity of the fracture, on the other hand, the markers are represented diagrammatically and in different shades, so as to improve understanding. FIG. 5 shows the horizon 50 in grey tint and the markers for the adjacent upper and lower horizons in black. The vertical displacement between the markers on the left part of FIG. 5 and the markers on the right part of the figure is representative of the net slip of the fracture. The horizon 50 is therefore represented by two markers 60 and 62, whilst the upper and lower horizons are respectively represented by two markers 64 and 66 on the one hand and 68 and 70 on the other hand. It is relatively easy on the section of FIG. 5 to track an horizon, i.e. to recognize that the markers 60 and 62 represent the same horizon, as do markers 64 and 66 or markers 68 and 70. In fact, the displacement between the markers is less than the distance between two adjacent markers.

Figure 6:
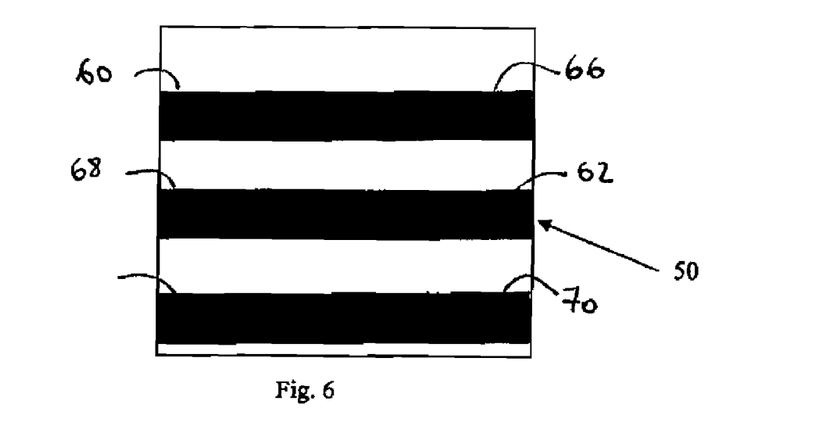

FIG. 6 shows a diagrammatic view of the second section 56. In the figure the markers already represented in FIG. 5 are again found, marked with the same numerical references. Due to the increasing displacement between the markers on either side of the fracture, the marker 60 of horizon 50 on the left of the figure is located opposite marker 66 of the upper adjacent horizon; similarly the marker 62 of horizon 50, on the right of the figure, is located opposite marker 68 of the lower adjacent horizon. In this figure, without the diagrammatic representation of the horizons in different shades, it would be very difficult for the user to track or pick horizon 50, i.e. to recognize that the two corresponding markers are markers 60 and 62—and not markers 60 and 61$i$ or markers 68 and 62.

Figure 7:
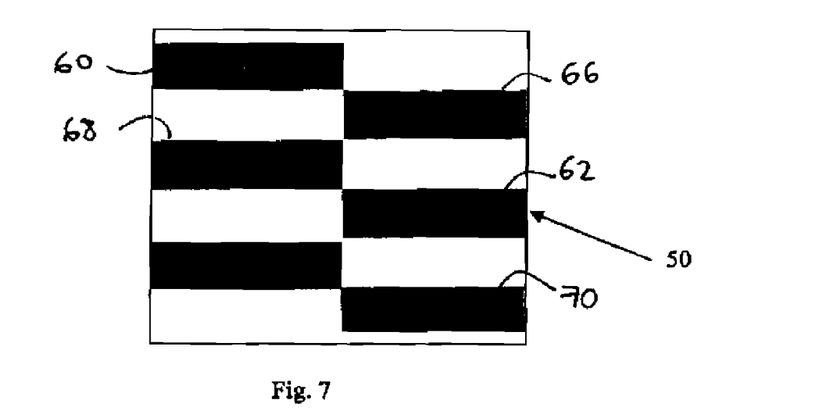
Figure 8:
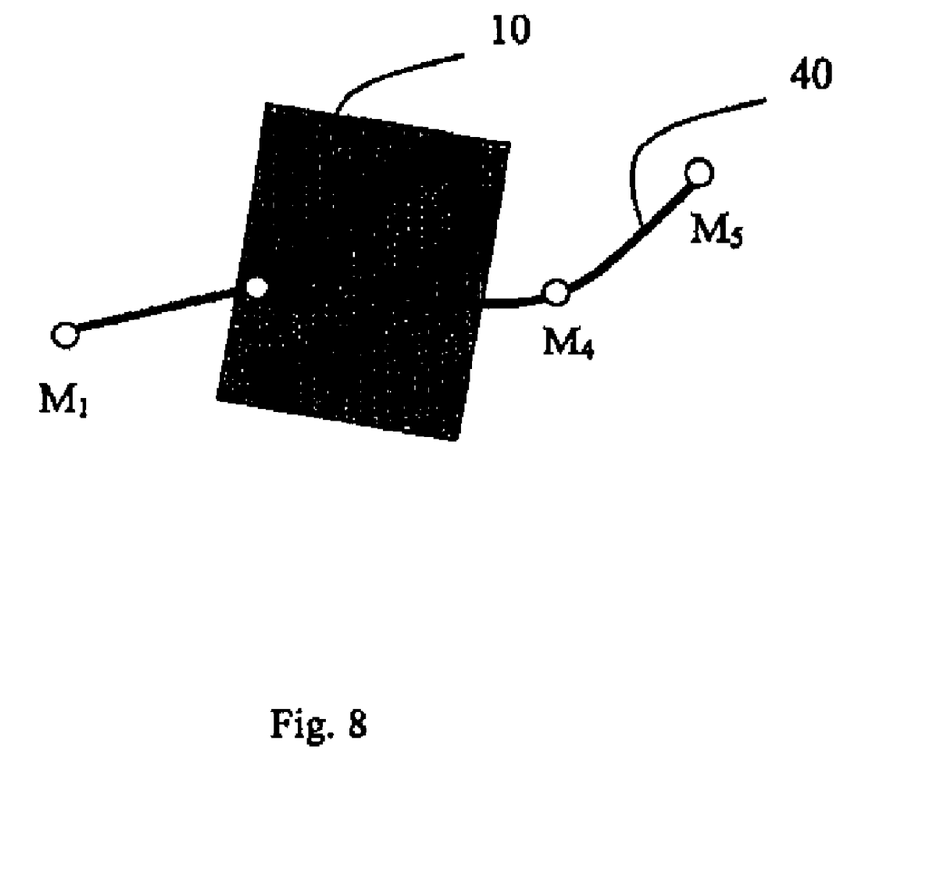
FIG. 8, a diagrammatic representation of a predefined trajectory of the cross section for the acquisition of points mode according to the invention.

FIG. 7 shows a diagrammatic view of the third section 58 with the same numerical references as in FIGS. 5 and 6. The displacement between the markers on either side of the figure is further pronounced. As in FIG. 6, without the diagrammatic representation of the horizons in different shades, it would be very difficult for the user to track or pick horizon 50.

The successive display to the user of the different surfaces according to the invention on the other hand allows effective tracking and picking of the markers. In fact the user first sees the section of FIG. 5, then the sections of FIGS. 6 and 7 successively. The perception of the movement of the markers between the successive sections allows the user to "track" the markers of horizon 50, with no risk of confusion with the adjacent markers.

The method also comprises a step of selection of points by the user, i.e. picking of the fracture plane over some sections 10 while they are displayed. The user can carry out picking over each of the surfaces, or simply over some of them.

The observer's principal task is the acquisition of a set of points representing the fracture plane. He is aided in this by the data display and observation mode which optimizes the selection of the points. In particular the dynamic display of the surfaces facilitates the tasks of locating the points and thus selecting them, i.e. picking.

The method also comprises a step of reconstruction of the fracture plane by the computer from the points selected by the user.

The method according to the invention considerably improves the solution of the prior art by displaying a sequence. Principally, the animation or successive display of the surfaces allows better perception of seismic events, in particular of the fracture plane sought, due to the persistence-of-vision effect. In fact, in noisy environments, the eye is very sensitive to movements and animation is an excellent means of analyzing seismic data by visual perception. Allowing picking during this animation phase is then a valuable aid. Moreover, animation allows rapid validation of the hypotheses produced during manual picking.

The gains are also valuable in a more general case, i.e. even if the signal to noise ratio is satisfactory. Detection of the points belonging to the fracture plan is then facilitated. Thus, in the examples of FIGS. 4 to 7, the signal to noise ratio is satisfactory; the display and picking according to the invention nevertheless improve the tracking of the fracture.

Thanks to constant updating of the visual content, animation allows the faculties of visual perception, in particular its persistence, to be exploited. In a sequence, visual perception easily detects a fracture which can be difficult to detect in the case of static vision, in particular in the case of seismics with a low signal to noise ratio. In fact the continuous micro-movements of the eye faced with an animation ensure better perception of contrasts, and similarly, of displacements of a fracture plane contained in the animation, a level of perception impossible to obtain with static images.

Psycho-visual studies have made it possible to measure the influence of the speed of display of images (surfaces 10) on the detection and selection of points of the fracture plane, the subject of the method. A speed greater than 5 images per second is preferable for human visual perception to be sensitive to the animation. These same studies show that an animation with more than 10 images per second is ideal as regards detection of virtual contours, in particular fractures in seismics. In fact, the speed of display can be a function of the precision of picking. The higher the speed is the less time is available to the user for picking over a surface; this reduction in time for each picking can adversely affect the precision of picking. An ideal range of 10 to 20 images per second can be adopted, in particular in the case of fracture detection. It should be noted that the speed can be advantageously adjusted by the user. This adjustment of the speed can involve an adjustment of the time interval between display of the successive surfaces of the sequence.

It is also possible to offer the user the opportunity to adjust the distance separating two successive surfaces; such an adjustment in particular allows better tracking and adaptation as a function of the nature of the disturbances. Thus, in the example of FIGS. 4 to 7, starting with a section (not shown) in which the fracture is not present and in which the markers are parallel, it is understood that it is useful to display the section of FIG. 5 before displaying the section of FIG. 7, in order to allow the user to perceive the presence of the fracture. It is therefore advantageous for the user to be able to adjust the distance between the successive sections.

These two adjustments can be independent—the display speed being varied whilst keeping a constant distance between two sections, or the distance being varied whilst keeping an identical duration between the display of the two sections. The user can also be allowed to simultaneously adjust the display speed and the distance between the sections. For example, it is possible to consider a block, and to impose a constant total duration of the pass through the block; in this case a variation in the display speed results in an inversely proportional variation in the distance between two successive sections.

In a sequence, the selection of an appropriate visual content optimizes the method. Starting with volume data, a plane visual content shown to the user is appropriate when it provides optimum observability of the sought fracture planes. For a selection of the points during a sequence, referred to as a dynamic point selection, the plane shown is constructed based on the fact that the visibility of the fracture is all the better when the user is situated perpendicular to it.

Figure 3:
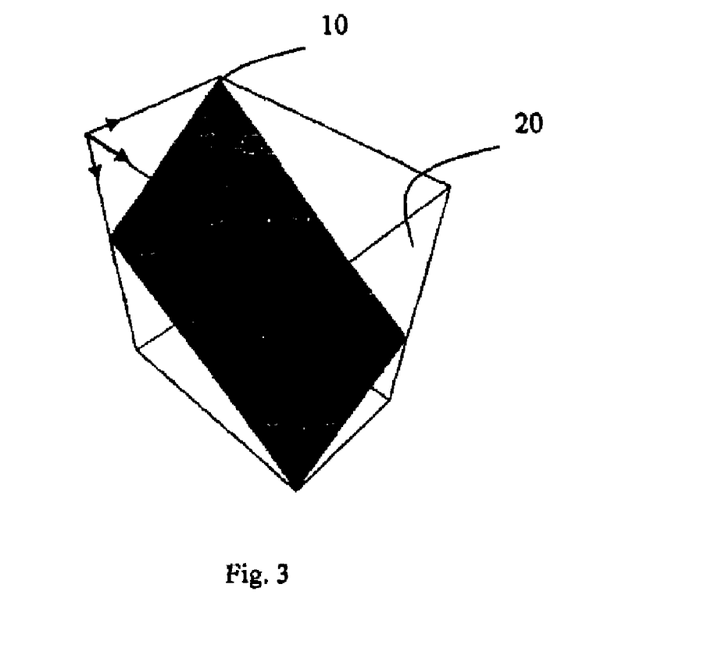
FIG. 3, a similar representation to that of FIG. 1, but showing the seismic data in the section plane.

The method is therefore all the more effective as it offers the observer a choice of viewing angles. The observation mode illustrated by FIG. 1 is based on the visualization of the sections 10 on the screen of the display unit. The visualization is shown in FIG. 3. Whatever the section displayed and the orientation of its plane are the representation of the section is co-planar with the screen of the display unit. The display of the section is carried out from a central point M and the normal n to the section directed along the observer's visual axis.

More generally, for example in the case of a combination of planes or a curved surface, the screen displays the projection of the surface over a plane passing through the central point of the surface and normal n directed along the observer's visual axis. In other words the points of the surface are projected onto the screen.

Figure 2:
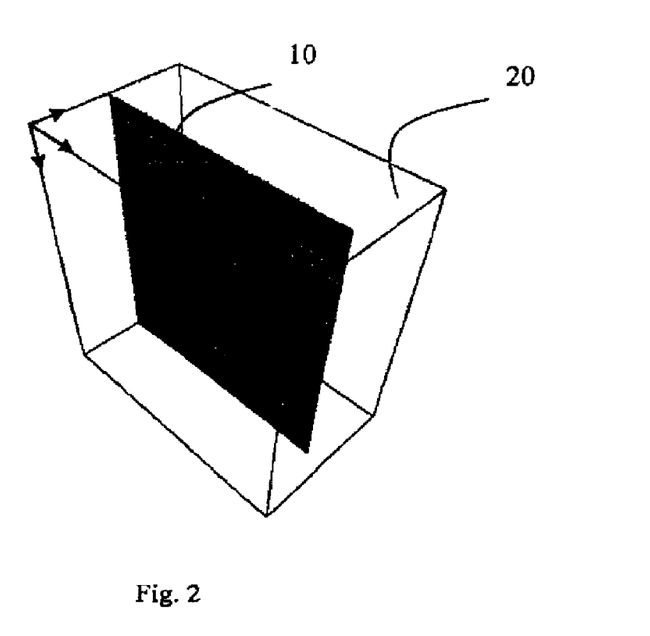
FIG. 2, a diagrammatic representation of an orthogonal section of a three-dimensional block in a system of the prior art.

It should be noted that the visualization mode of FIG. 3 is more suitable than that based on a section 10 perpendicular to one of the three orthonormal axes (x, y, z) of the three-dimensional block 20, i.e. the Inline, Crossline or Timeslice modes, a standard seismic visualization mode. FIG. 2 shows such a visualization which is not very discriminating as regards the sought fracture plane.

The method aims to collect points describing a fracture plane on the basis of a visual observation. In order to do this, the observer analyzes on the fly the value at each point on the surface 10 during the display in order to make his selection.

The overall task of fracture-plane detection consists of several sub-tasks: a local analysis of the measurement of each point, a selection of the points using an acquisition peripheral and control of the peripheral in order to ensure displacement in coherence with the spatial development of the fracture in the three-dimensional block. It is useful to reduce the degree of complexity of the overall task necessary for the selection. A subdivision of the sub-tasks resulting from a breakdown of the navigation phases from image to image and selection of the points can be used advantageously. The navigation task can be moved into an upstream phase where the user provides, via an interface, the parameters of a predefined trajectory, or even defines a set of trajectories using key points, called markers, in the three-dimensional block 20. These markers are called ($M_i$) in FIG. 4. The trajectory 40 provided or constructed on the markers then becomes the support of the pass used for the points selection phase. The selection phase is initiated by starting the display of a sequence orthogonal to this trajectory 40 the sections of which are sequenced according to the pass chosen by the user.

The trajectory 40 can be chosen from prior knowledge of the three-dimensional block 20, its environment, its properties or any georeferenced information.

The display of a sequence of the three-dimensional block 20 can then be carried out according to two modes. Either the user decides to keep control over the mode of visualization and can also alternate the task of point selection with the task of navigation in the three-dimensional block 20 (rotation, zoom, displacement), or he puts himself in automatic navigation mode in which case the three-dimensional reference point is modified in real time with the displacement of the surface 10 along the trajectory 40. In the latter case, the camera is then always positioned orthogonal to the surface 10, at the point-trajectory point of the surface, defined by the intersection of the surface with the trajectory curve, and at a fixed distance from this same surface, for example from the camera at the point-trajectory of the surface. This latter mode facilitates the selection of points to the extent that the surface 10 displayed is not displaced on the screen; it appears fixed due to the displacement of the camera. The user can then concentrate solely on the relative movements of the fracture without being distracted by the movements of the surface 10 on the screen. The surfaces 10 are moreover displayed on the same scale, which makes it possible to avoid any effect of perspective viewing which would adversely affect the perception of the relative movements of the fracture plane during display of a sequence. The selection of the points is also more precise.

The display of the surfaces 10 can be carried out according to different passes along the trajectory 40. The pass is generally made from one end to the other of the trajectory 40. However, it is also possible to oscillate between the two end points of this trajectory 40. The oscillation makes it possible to return to a zone of the fracture and complete a preliminary selection of points. It is also possible to determine two intermediate points between which mini-oscillations will take place. These mini-oscillations make it possible to concentrate the animation on mini-variations of the relative position of the fracture and thus to refine the selection of points.

The user can also control the number of oscillations. In fact the present invention comprises a step wherein the user stops the oscillations, as well as a step of continuing the pass up to the next phase of oscillations or one end of the trajectory 40.

During the animation of the surfaces 10, the distance between two successive surfaces 10 is initially positioned at one pixel of difference, but it can be chosen by the user. The distance can be expressed in pixels, or even in real units which will be converted into pixels. It should be noted that a distance of one pixel is the minimum distance making it possible to avoid any superposition of successive sections 10. The distance can advantageously be adjusted by the user, as indicated above. Moreover, the adjustment of the distance and the speed can depend on the curve of the trajectory considered; in fact, on a curved trajectory and in the case of plane sections, if the sections are perpendicular to the trajectory, they are not parallel. As the user moves away from the center of the section—in the example of FIG. 8 where the trajectory passes through the center of the section—the distance between two successive sections increases. In order to retain an overall view of the continuity between successive sections, it can be advantageous to reduce the distance between the sections when the trajectory is curved. This can be an adjustment proposed to the user, or a default value proposed to the user depending on the curve.

Moreover, a strong curve of the trajectory 40 in conjunction with large dimensions of surfaces 10 risks producing a considerable distance between the edges of two surfaces 10 displayed successively. The radius of curvature of the trajectory 40 defines an angular speed of display. For a given angular speed, the further the user moves away from the point-trajectory in the plane of the surface 10, the greater the distance between two successive displayed surfaces 10 is. This is why either the dimension of the displayed surfaces 10 will be limited by the trajectory 40 chosen, or the curve of the trajectory 40 will be limited by the dimension of the displayed surfaces 10.

The selection of points developing along pre-established trajectories, the spatial distribution of the selected points is not generally homogeneous during the first pass of a trajectory 40. In order to overcome this problem, it is possible to construct an incremental diagram filling in the set of selected points. This principle means that the acquisition phase can be carried out whilst observing the points previously acquired during a previous selection. In order to do this, storage of the selections of points is necessary. The storage makes it possible from then onwards to display preceding selections of points on which new selections of points will be iterated, in order to homogenize the density of selected points on the fracture. In order not to interfere with visibility by a superimposing of the points situated between the camera and the current section 10, an occultation plane can be placed perpendicular to the direction of observation and parallel to the current selection zone, this plane is referred to as a clipping plane.

The use of conformed surfaces in a combination of planes or curved surface makes it possible to offer the user a future or past view, or to adapt the surface to particular conditions.

The curved surface can be seen by the user from the concave side, i.e. the center of curvature is on the side of the preceding surface according to the pass of the trajectory, or on the user's side. The user then sees, in the center of the screen, the points of a plane section corresponding to the front (in the direction of progression) of the curved surface. On the sides, the user sees points which belong to a preceding plane section, i.e. past points. These points can have already been picked, which can assist the user in picking in the vicinity of the center of the screen.

The center of curvature can be on the side of the following surface in the direction of progression; in other words, the user is on the convex side of the curved surface. In this case, the user sees, in the center of the screen, the points of a plane section corresponding to the rear (in the direction of progression) of the curved surface. On the sides, the user sees points which belong to plane sections which are at the front (in the direction of progression) of this plane section. In other words, the user sees, on the sides of the screen, "future" points in the direction of progression. If some of the points have already been picked, the use of such a curved surface can assist the user in picking the points on the sides of the screen.

These developments for a curved surface can be transposed to the use of a surface conformed to a combination of planes, such as a plane orthogonal to the trajectory and at least one second plane forming an edge with this orthogonal plane. As a function of the direction of the concavity of the plane combination relative to the direction of propagation, it is possible to see on the sides of the screen, points which are in the future or the past with respect to the points displayed in the center of the screen.

The value of the convexity or concavity—the angle between the planes in the example of a surface combination—is representative of the extent of progression towards the future or regression towards the pass. This curve is not linked to the speed of display; it is possible to let the user choose, or to offer him predefined choices of surfaces with different convexity or concavity values.

Figure 10:
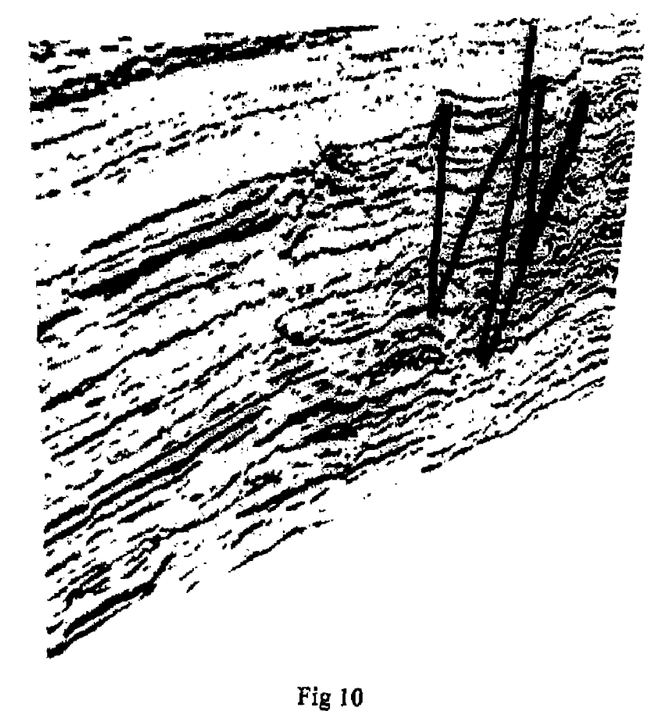
FIGS. 10, 11 and 12, an illustration of the steps and the results of the method according to the invention.
Figure 11:
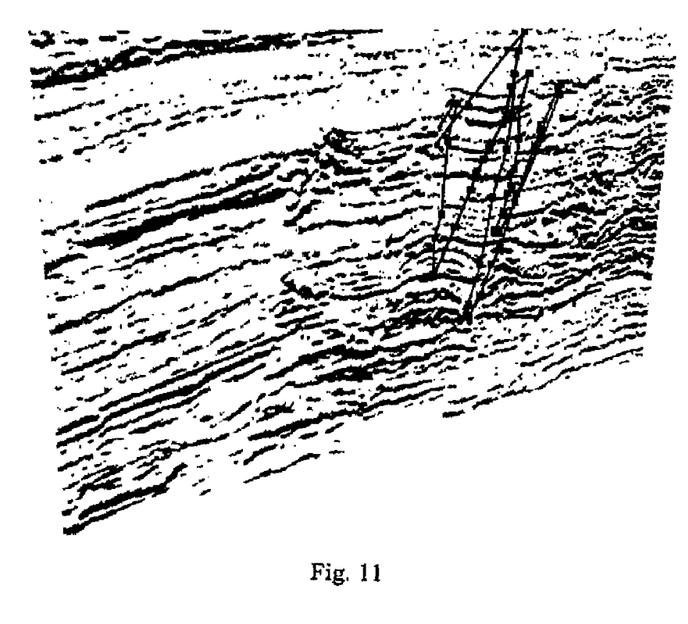

Interactive means for the removal of some selected points can also be provided. In fact, as in any picking task, the user can sometimes select incoherent points and wish to "delete" them without recommencing the whole picking task. For this purpose, the cloud of points initially picked is simplified by a polygonal approximation method in order to reduce the number of points describing the surface without altering its morphology (the method is illustrated in FIGS. 10 and 11). Finally, an interactive eraser is provided, with which the user simply selects the points that he wishes to remove.

The method according to the invention comprises a phase dedicated to the reconstruction of the fracture from the selected points. The fracture plane is then treated as a dense surface, open or closed, and initially represented by the set of points resulting from the selection. The reconstruction produces a triangulated version of the surface taking into account the heterogeneity of the selection. Two cases can be envisaged depending on the confidence placed in the initial points. Either the reconstructed surface passes through all the points selected, or it passes at best through the set of points. Various methods of surface approximation are then used, for example Delaunay's triangulation method in the first case and the least squares method in the second case.

At the operational level, in both cases, the algorithm proposed uses a parameterized version of the surface. The surface modeling can be local or global depending on the complexity of its shape. In the case of closed surfaces, a more local approach will be preferred in order to adapt to the possible strong curves of the shape.

The reconstruction phase can be carried out starting only with the information of the coordinates of the selected points but it can also use local weighting based on a seismic attribute characteristic of the seismic event studied. In the case of a fracture a coherency attribute can be used. Such an attribute is described in the geophysical literature, for example in the U.S. Pat. No. 5,563,949. This reconstruction makes it possible to smooth the fracture during its synthesis, or even to texturize its surface. Moreover, the reconstructed fracture can be displayed and observed in any direction and from any angle.

A step of reconstruction and display of the fracture can also be carried out during the steps of display of a sequence and selection of points; the fracture is then reconstructed, displayed and updated after each point selection.

During the display of the reconstructed fracture, it is possible to superpose said fracture with a planigraphic plane. The planigraphic plane can mask one of the parts of the fracture by clipping the reconstructed surface. Thus one part of the fracture will not block observation of another part.

It is also possible to visualize only the intersection of the planigraphic plane with the reconstructed fracture in order to observe a simple planigraphic plane of the fracture.

The planigraphic plane can moreover be displaced along a trajectory determined by the user. The trajectory can moreover be that provided by the user for determination of the sections 10 to be displayed. This displacement makes it possible to better track the variations in the reconstructed fracture, thanks to the sensitivity of the visual perception of movement.

Figure 9:
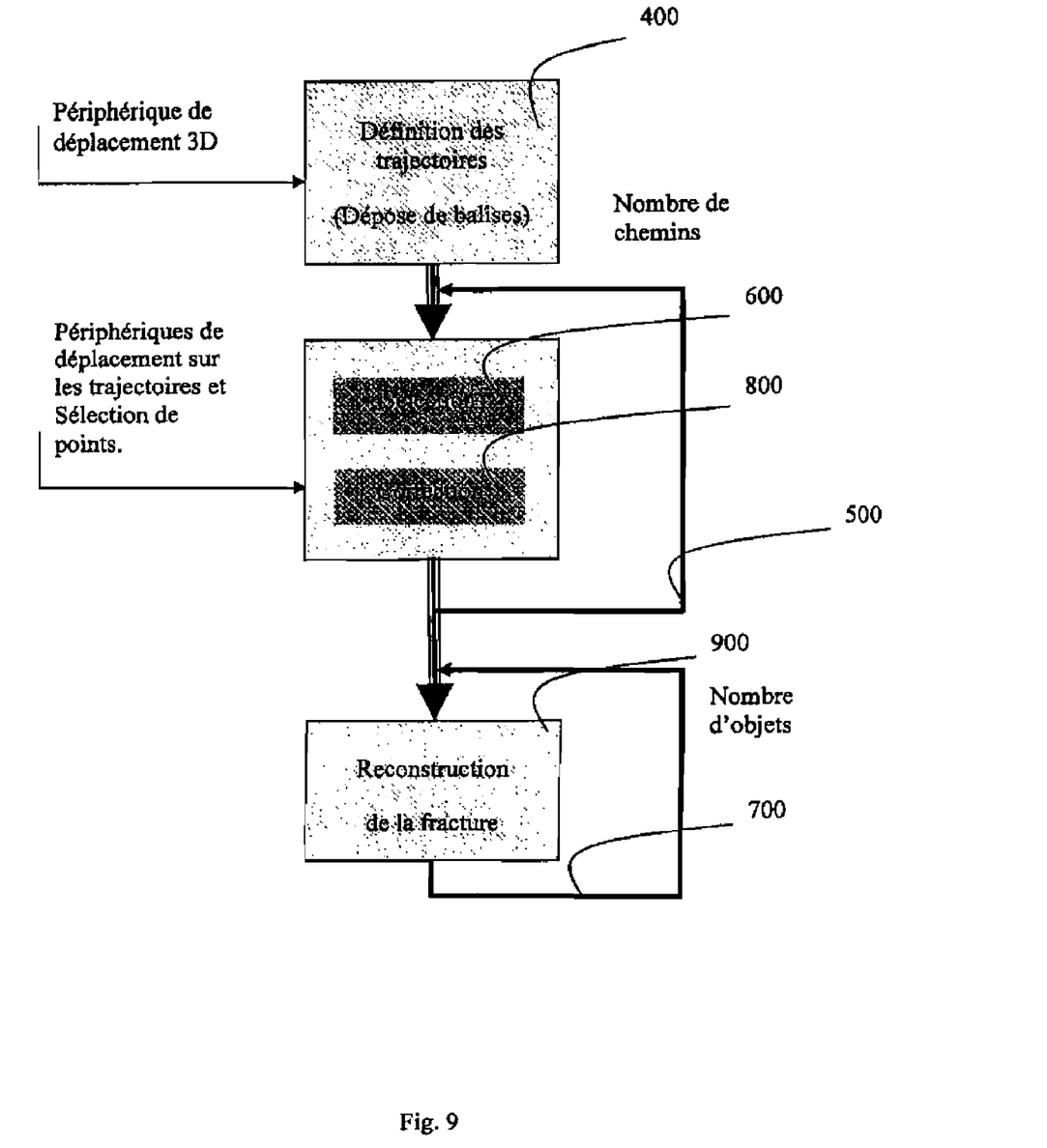
FIG. 9, a diagrammatic representation of the different steps of the method according to the invention.

FIG. 9 shows a diagram of the method comprising the step of definition 400 of trajectories 40 following a laying down of markers. The laying down of markers is carried out by operating a three-dimensional displacement peripheral. Step 400 leads to the step of selection of points 600 belonging to the fracture plane during the displacement over the different trajectories 40. Each step of selection of points 600 can be followed by a correction step 800 which makes it possible to remove some selected points. If several trajectories 40 have been defined during the step of definition of trajectories 400, it is possible to repeat the steps of selection 600 and of correction 800 for each of the trajectories by storing for each trajectory the points selected during the displacements along the preceding trajectories. Finally, once the points are selected, the method can pass to the step of reconstruction 900 of the fracture plane, or of several fracture planes if the selection of the points is made over distinct fracture planes.

In fact, if the event picked is broken down into several trajectories each representing an independent object, i.e. fracture plane, then a sequential strategy can be applied during the reconstruction. In the diagram of FIG. 4, this principle is illustrated by the repetition of the steps of selection and correction 500 or by the repetition of the reconstruction step 700. A network of fractures is a good example, each of the fractures being able to be treated independently.

However, if the selection of points of an event to be reconstructed is made along several trajectories and this event consists of a single fracture plane, the reconstruction step must be based on the set of points.

Figure 12:
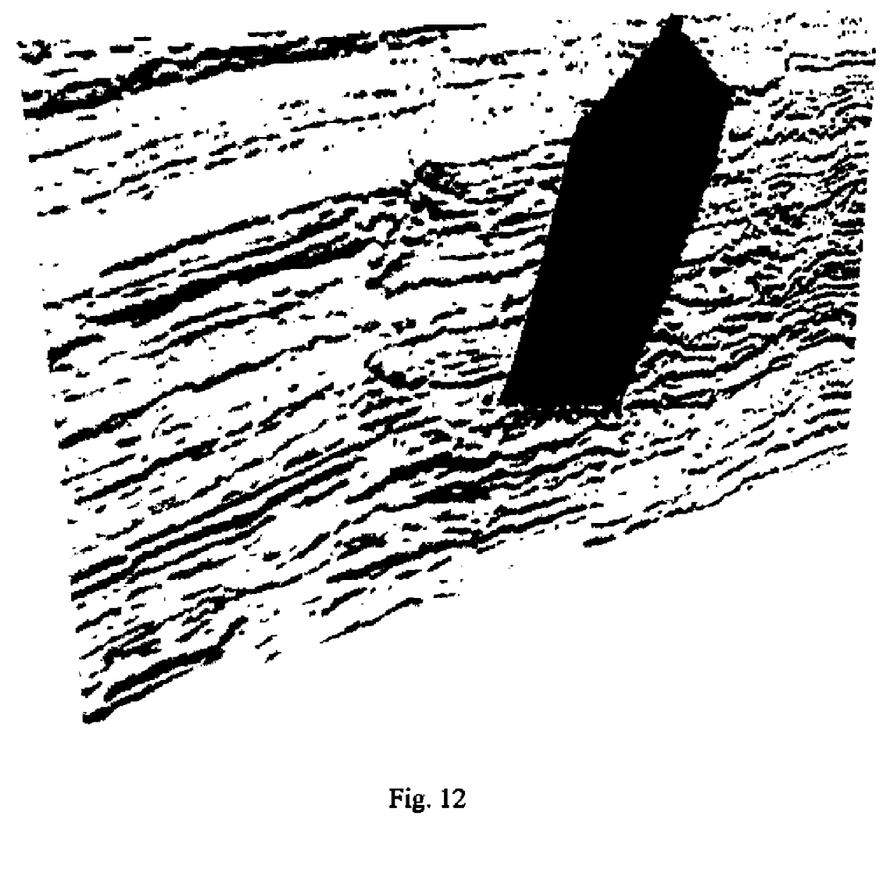

FIGS. 10 and 12 show the results of the invention, in an example. FIG. 10 shows the points obtained by dynamic picking, during the display of the successive sections of a sequence. FIG. 11 shows the results of a step of reduction of the cloud of points. FIG. 12 shows the results of a reconstruction in three dimensions of the fracture plane.

The present invention also relates to a program implementing the method described above. The program can comprise a routine for the reception of a three-dimensional block 20 of values, a routine for the display of points of this set, in the form of a succession of surfaces 10 of the three-dimensional block 20, a routine for the selection, during the display, of points chosen by a user over some of the displayed surfaces 10, and a routine for the reconstruction and display of a surface from the selected points.

This program makes it possible in particular to improve the prior art by displaying an animation of a succession of surfaces 10 in a three-dimensional block 20.

The program has all the advantages attributed to the method. The present invention also relates to a system comprising a memory containing the program described above, a program processing logic unit, a display unit and an input/output unit allowing picking on the display unit. This system has the same advantages as those attributed to the method and to the program.

The invention claimed is:

1. Method for the reconstruction of a fracture plane in a three-dimensional set of values, comprising the steps of:
    providing a computer with the three-dimensional set;
    displaying by the computer a temporal succession of surfaces of the three-dimensional set;
    selecting by the user points of the fracture plane over some of these surfaces during their display, during the step of displaying by the computer said temporal succession of surfaces; and
    reconstructing by the computer the fracture plane from the points selected by the user.

2. The method according to claim 1, wherein the displaying step comprises display of the surfaces on the same scale.

3. The method according to claim 1, comprising the provision by the user of a trajectory and the display of surfaces orthogonaly to the trajectory.

4. The method according to claim 1, also comprising a step wherein the user chooses the distance between two successive surfaces.

5. The method according to claim 1, also comprising a storage of the selections of points and a repetition of the display and selection steps during which the stored points are displayed.

6. The method according to claim 1, wherein the steps of selection of the points and reconstruction of the fracture are simultaneous.

7. The method according to claim 1, further comprising a step of displaying the reconstructed fracture.

8. The method according to claim 7, in which the step of display of the reconstructed fracture comprises the masking by a planigraphic plane of part of the reconstructed fracture.

9. The method according to claim 8, wherein the step of display of the reconstructed fracture comprises the displacement of the planigraphic plane.

10. The method according to claim 1, wherein the displaying step comprises the display of the surfaces at a speed adjusted for allowing persistence of visual perception.

11. The method according to claim 1, wherein the displaying step comprises the display of the surfaces at a speed function of the precision of picking.

12. The method according to claim 1, wherein the displaying step comprises the control by the user of a time interval between the display of the successive surfaces.

13. A computer program recorded on a computer-readable medium, comprising a program code for implementing all the steps of a method for the reconstruction of a fracture plane in a three-dimensional set of values, comprising the steps of:

providing a computer with the three-dimensional set;

displaying by the computer a temporal succession of surfaces of the three-dimensional set;

selecting by the user points of the fracture plane over some of these surfaces during their display, during the step of displaying by the computer said temporal succession of surfaces; and reconstructing by the computer the fracture plane from the points selected by the user.

14. The computer program according to claim 13, wherein the displaying step comprises display of the surfaces on the same scale.

15. The computer program according to claim 13, comprising the provision by the user of a trajectory and the display of surfaces orthogonaly to the trajectory.

16. The computer program according to claim 13, also comprising a step wherein the user chooses the distance between two successive surfaces.

17. The computer program according to claim 13, also comprising a storage of the selections of points and a repetition of the display and selection steps during which the stored points are displayed.

18. The computer program according to claim 13, wherein the steps of selection of the points and reconstruction of the fracture are simultaneous.

19. The computer program according to claim 13, further comprising a step of displaying the reconstructed fracture.

20. The computer program according to claim 19, in which the step of display of the reconstructed fracture comprises the masking by a planigraphic plane of part of the reconstructed fracture.

21. The computer program according to claim 20, wherein the step of display of the reconstructed fracture comprises the displacement of the planigraphic plane.

22. The computer program according to claim 13, wherein the displaying step comprises the display of the surfaces at a speed adjusted for allowing persistence of visual perception.

23. The computer program according to claim 13, wherein the displaying step comprises the display of the surfaces at a speed function of the precision of picking.

24. The computer program according to claim 13, wherein the displaying step comprises the control by the user of a time interval between the display of the successive surfaces.

25. A system comprising:

a memory containing a computer program recorded on a computer-readable medium, comprising a program code for implementing all the steps of the system, comprising the steps of:

providing a computer with the three-dimensional set;

displaying by the computer a temporal succession of surfaces of the three-dimensional set;

selecting by the user points of the fracture plane over some of these surfaces during their display, during the step of displaying by the computer said temporal succession of surfaces; and reconstructing by the computer the fracture plane from the points selected by the user;

a program processing logic unit;

a display unit; and an input/output unit allowing picking on the display unit.

26. The system according to claim 25, wherein the displaying step comprises display of the surfaces on the same scale.

27. The system according to claim 25, comprising the provision by the user of a trajectory and the display of surfaces orthogonaly to the trajectory.

28. The system according to claim 25, also comprising a step wherein the user chooses the distance between two successive surfaces.

29. The system according to claim 25, also comprising a storage of the selections of points and a repetition of the display and selection steps during which the stored points are displayed.

30. The system according to claim 25, wherein the steps of selection of the points and reconstruction of the fracture are simultaneous.

31. The system according to claim 25, further comprising a step of displaying the reconstructed fracture.

32. The system according to claim 31, in which the step of display of the reconstructed fracture comprises the masking by a planigraphic plane of part of the reconstructed fracture.

33. The system according to claim 32, wherein the step of display of the reconstructed fracture comprises the displacement of the planigraphic plane.

34. The system according to claim 25, wherein the displaying step comprises the display of the surfaces at a speed adjusted for allowing persistence of visual perception.

35. The system according to claim 25, wherein the displaying step comprises the display of the surfaces at a speed function of the precision of picking.

36. The system according to claim 25, wherein the displaying step comprises the control by the user of a time interval between the display of the successive surfaces.

* * * * *